(No Model.)
R. G. RIDER.
NUT LOCK.
No. 598,114. Patented Feb. 1, 1898.
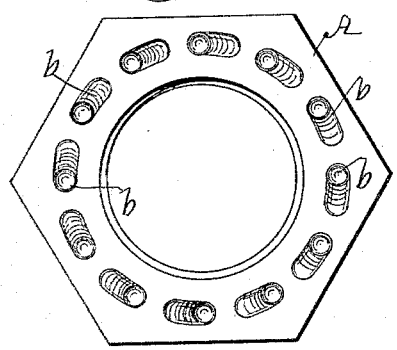
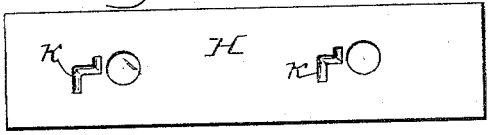
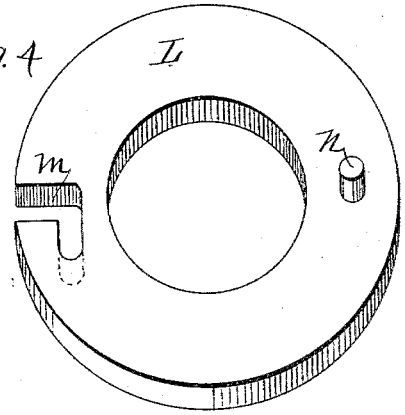
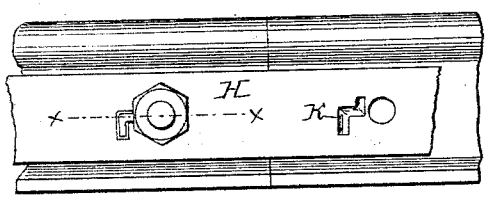
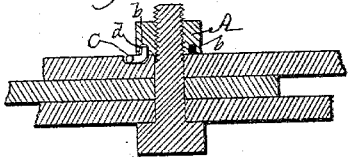
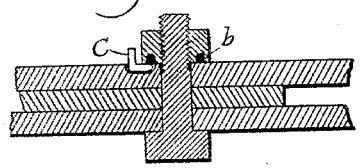
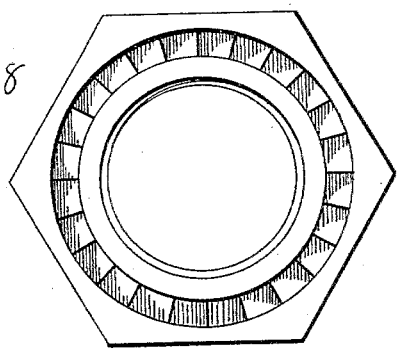
Witnesses: J. A. Bramhall. Jas. Darels.
Inventor: Robert G. Rider, By Thomas G. and J. Ralph Orwig, Attorneys.

UNITED STATES PATENT OFFICE.

ROBERT G. RIDER, OF MOUNT AYR, IOWA.

NUT-LOCK.

SPECIFICATION forming part of Letters Patent No. 598,114, dated February 1, 1898.

Application filed April 22, 1897. Serial No. 633,417. (No model.)

*To all whom it may concern:*

Be it known that I, ROBERT G. RIDER, a citizen of the United States, residing at Mount Ayr, in the county of Ringgold and State of Iowa, have invented a new and useful Nut-Lock, of which the following is a specification.

My object is to provide a simple, strong, and durable nut-lock adapted for use in railway-rail joints, bridges, and all kinds of manufactures and machinery where it is important to retain detachable nuts securely on the ends of bolts as long as may be desired.

My invention consists in the construction, arrangement, and combination of parts, as hereinafter set forth, pointed out in my claims, and illustrated in the accompanying drawings, in which—

Figure 1 is a bottom view of a nut adapted to be engaged and locked when in proper position on a bolt by means of an adjustable key. Fig. 2 is a face view of a fish-plate or splice-bar for a railway-rail joint provided with grooves adapted to retain an adjustable key in proper position relative to a nut on a bolt. Fig. 3 is a perspective view of a key adapted to be placed in a groove in the surface of any object against which the bottom face of a nut is to rest when in practical use. Fig. 4 is a perspective view of a washer in an inverted position and provided with a slot and opening adapted to receive the key and to aid in locking a nut. Fig. 5 shows my lock applied to a railway-rail joint. Fig. 6 is a sectional view through the line $x$ $x$ of Fig. 5, showing the key in position as required to lock the nut. Fig. 7 is a view corresponding with Fig. 6, but shows the nut unlocked and the relative positions of the key and fish-plate having a groove and the nut having recesses in its under face to receive the inner end of the key as required to lock the nut. Fig. 8 is a modification of Fig. 1 and shows a ratchet-faced annular groove on the under side of a nut adapted to engage the inner end of a key that is tapering and fitted in form and shape to engage the ratchet-face as required to lock the nut.

The letter A designates a nut of hexagon form provided with a series of elongated grooves $b$ in its under surface adapted to receive the inner end of a key. These grooves are in a circular line and some distance from the outer edge of the nut.

C is a key made of a single piece of wire that may vary in size to suit nuts of different sizes. It is elbow-shaped and has an extension $d$ at its inner end projecting at right angles to the plane of the main elbow-shaped portion and is adapted to enter a groove $b$ in the bottom of the nut when that elbow-shaped portion is rotated a quarter of a revolution as required to turn the outer and exposed end of the key into the groove or cavity provided therefor to protect it from contact with extraneous objects and to maintain the key securely in a stationary position and in engagement with the nut.

H represents the fish-plate or splice-bar of a railway-rail joint provided with elbow-shaped grooves $k$ in its outside surface adapted to admit an elbow-shaped key C, as shown in Figs. 6 and 7 and as required to lock and unlock the nut.

L represents a washer that has an elbow-shaped slot $m$ in its under surface adapted to receive an elbow-shaped key C, and it also has a projection $n$, adapted to enter a corresponding opening in the surface of the object upon which the washer is placed preparatory to locking a nut on top of it. The projection prevents the washer from turning with the nut.

In practical operation of my invention the key C is placed in the elbow-shaped groove of the surface next to the nut, as shown in Fig. 7, and when the nut is drawn tight on the bolt the outer end of the key is depressed into the groove and the inner end by such movement elevated into one of the recesses $b$ in the under face of the nut, as shown in Fig. 6. No portion of the key will then project outside of the outer surface of the nut or the washer to be engaged by anything that might change the position of the key or impair the lock. A reverse motion of the adjustable key unlocks the nut.

I claim as my invention—

1. In a nut-lock, an elbow-shaped key having an extension at its inner end projecting at right angles to the plane of the main elbow-shaped portion, in combination with a nut having recesses in its under surface to admit the inner end of said key and its outer end adapted to lie flat in an elbow-shaped recess outside of the circumference of the nut in the surface engaged by the inner face of the nut as and for the purposes stated.

2. A nut-lock comprising an elbow-shaped key having an extension at its inner end projecting at right angles to the plane of the main elbow-shaped portion, a nut having recesses on its under side to admit the inner end of the key, and a washer, or its equivalent, having an elbow-shaped groove to admit the elbow-shaped key that projects beyond the circumference of the nut, arranged and combined to operate in the manner set forth.

ROBERT G. RIDER.

Witnesses:
J. M. FULLER,
THOMAS G. ORWIG.